(12) United States Patent
Thornton et al.

(10) Patent No.: US 8,705,316 B2
(45) Date of Patent: Apr. 22, 2014

(54) PASSIVE SEISMIC DATA ACQUISITION AND PROCESSING USING MULTI-LEVEL SENSOR ARRAYS

(75) Inventors: Michael P. Thornton, Houston, TX (US); Leo Eisner, Houston, TX (US); Peter M. Duncan, Houston, TX (US)

(73) Assignee: Microseismic, Inc., Houston, TX (US)

( * ) Notice: Subject to any disclaimer, the term of this patent is extended or adjusted under 35 U.S.C. 154(b) by 1052 days.

(21) Appl. No.: 12/753,919

(22) Filed: Apr. 5, 2010

(65) Prior Publication Data

US 2011/0242934 A1  Oct. 6, 2011

(51) Int. Cl.
*G01V 1/20* (2006.01)
*G01V 1/00* (2006.01)
*G01V 1/28* (2006.01)

(52) U.S. Cl.
CPC ............ *G01V 1/006* (2013.01); *G01V 2210/65* (2013.01); *G01V 2210/1234* (2013.01); *G01V 1/288* (2013.01)
USPC .......................................................... 367/61

(58) Field of Classification Search
CPC ................... G01V 2210/65; G01V 2210/1234
See application file for complete search history.

(56) References Cited

U.S. PATENT DOCUMENTS

| | | | |
|---|---|---|---|
| 4,559,605 A * | 12/1985 | Norsworthy | 708/403 |
| 4,677,596 A * | 6/1987 | Lyle et al. | 367/46 |
| 5,448,531 A * | 9/1995 | Dragoset, Jr. | 367/45 |
| 5,506,769 A * | 4/1996 | Fu et al. | 702/8 |
| 6,111,816 A * | 8/2000 | Chiang et al. | 367/7 |
| 6,175,536 B1 * | 1/2001 | Khan | 367/32 |
| 6,552,964 B2 * | 4/2003 | Chiang et al. | 367/138 |
| 2004/0125696 A1* | 7/2004 | Jones et al. | 367/14 |
| 2009/0010104 A1* | 1/2009 | Leaney | 367/47 |
| 2009/0201763 A1* | 8/2009 | Jones et al. | 367/5 |
| 2009/0259406 A1 | 10/2009 | Khadhraoui | |
| 2010/0228530 A1* | 9/2010 | Valero et al. | 703/2 |
| 2010/0265094 A1* | 10/2010 | Zannoni et al. | 340/853.3 |
| 2011/0085421 A1* | 4/2011 | Cotterill | 367/138 |

OTHER PUBLICATIONS

International Search Report and Written Opinion; application PCT/US2011/029720.

* cited by examiner

*Primary Examiner* — Mark Hellner
*Assistant Examiner* — Ari M Diacou
(74) *Attorney, Agent, or Firm* — Richard A. Fagin

(57) ABSTRACT

A method for passive seismic surveying includes deploying seismic sensors in a plurality of spatially distributed wellbores disposed above a volume of subsurface formations to be evaluated. The sensors in each wellbore form a line of sensors. Each sensor generate optical or electrical signals in response to seismic amplitude. The seismic signals from each sensor are recorded for a selected period of time. The response of the seismic sensor recordings is beam steered to at least one of a selected point and a selected volume in the subsurface. At least one microseismic event is identified in the beam steered response.

22 Claims, 2 Drawing Sheets

US 8,705,316 B2

PASSIVE SEISMIC DATA ACQUISITION AND PROCESSING USING MULTI-LEVEL SENSOR ARRAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of passive seismic surveying. More specifically, the invention relates to methods for deploying sensors and acquiring passive seismic data to reduce noise and enhance ability to identify microseismic events.

2. Background Art

Passive seismic emission tomography is a process in which an array of seismic sensors is deployed in a selected pattern on the Earth's surface (or on the water bottom in marine surveys) and seismic energy is detected at the sensors that emanates from various seismic events occurring within the Earth's subsurface ("microseismic events"). Processing the signals detected by the sensors is used to determine, among other things, the position in the Earth's subsurface at which the various seismic events took place.

Applications for passive seismic emission tomography include, for example, determining the point of origin of microearthquakes caused by movement along geologic faults (breaks in rock layers or formations), movement of fluid in subsurface reservoirs, and monitoring of movement of proppant-filled fluid injected into subsurface reservoirs to increase the effective wellbore radius of wellbores drilled through hydrocarbon-producing subsurface Earth formations ("fracturing"). The latter application, known as "frac monitoring" is intended to enable the wellbore operator to determine, with respect to time, the direction and velocity at which the proppant filled fluid moves through particular subsurface Earth formations.

Passive seismic emission tomography for the above types of interpretation includes determining what are seismic-induced events from within the signals detected at each of the seismic sensors, and for each event detected at the seismic sensors, determining the spatial position and time of the origin of the seismic event.

In applications for passive seismic emission tomography related to reservoir and/or frac monitoring, typically the dominant sources of noise occur proximate the Earth's surface. One technique for reducing such noise is to place the each of the sensors in a wellbore drilled through near-surface layers of sediment and rock. By placing the sensors in wellbores, typically at depths of about 100 meters, surface occurring noise can be reduced in the detected seismic signals. Even using such technique, there is a need for improved surface occurring noise reduction to enable detection of small amplitude microseismic events. Generally, surface noise diminishes with depth of the sensor and the signal increases as the sensors are closer to the events, resulting in increased signal-to-noise ratio. Therefore the most common installation of such monitoring sensors is to deploy one geophone into each borehole as deep as possible. Even at such greater depths, there is still a need for improved noise reduction in passive seismic sensing arrays.

SUMMARY OF THE INVENTION

1. A method for passive seismic surveying according to one aspect of the invention includes deploying seismic sensors in a plurality of spatially distributed wellbores disposed above a volume of subsurface formations to be evaluated. The sensors in each wellbore form a line of sensors. Each sensor generates optical or electrical signals in response to seismic amplitude. The seismic signals from each sensor are recorded for a selected period of time. The response of the seismic sensor recordings is beam steered to at least one of a selected point and a selected volume in the subsurface. At least one microseismic event is identified in the beam steered response.

A computer readable medium according to another aspect of the invention includes a computer program stored thereon. The program has logic operable to cause a programmable computer to execute steps comprising the following. The computer accepts as input recordings of electrical or optical signals detected by seismic sensors disposed in a plurality of spatially distributed wellbores disposed above a volume of subsurface formations to be evaluated. The sensors in each wellbore form a line of sensors. The response of the seismic sensor recordings are beam steered to at least one of a selected point and a selected volume in the subsurface. At least one microseismic event is identified in the beam steered response.

Other aspects and advantages of the invention will be apparent from the following description and the appended claims.

DETAILED DESCRIPTION

Figure 1:
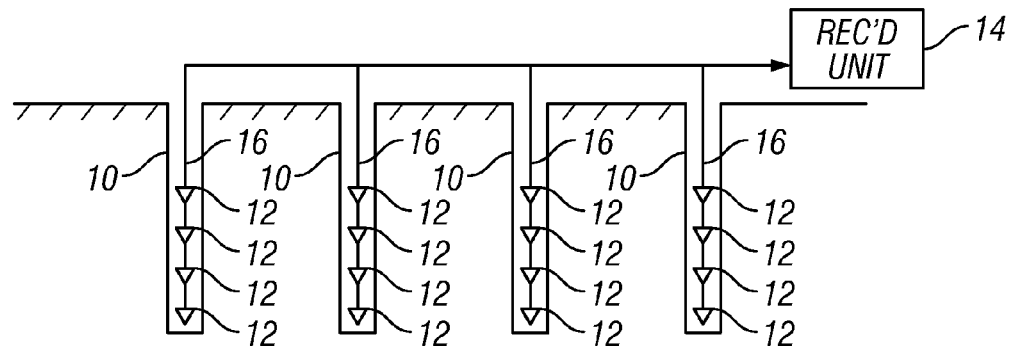
FIG. 1 is a cut away view of one line of sensors in a sensor array according to the invention.

FIG. 1 shows a cut away view of one line of sensors in a two dimensional array of sensors according to the invention. A plurality of wellbores 10 are drilled to a selected depth below the Earth's surface. In practice, the depth is typically about 100 meters, although different depths may be used. For example, in the presence of very high levels of surface occurring noise, the wellbores may be drilled deeper. In some examples, existing wellbores may be used, for example, wellbores that are no longer used to produce or inject fluid.

A substantially vertically arranged array of seismic sensors 12 may be placed into each wellbore in the present example. The sensors 12 may be single component or multi-component (three sensitive axis) geophones, for example. The sensors 12 may be inserted by suspending them on a cable 16 and then filling the wellbore 10. In one example, the spacing between adjacent sensors is about 17 meters. The example shown uses four sensors 12 in each vertical array, but the exact number of sensors in each array is not a limit on the scope of the invention. Typically, the depths of corresponding sensors 12, that is, the lowest sensor, second lowest, etc., in each array will be placed at substantially the same depth. In other examples, a shallow wellbore at an inclined angle may be drilled, for example to a true vertical depth of about 100 meters. The angle of inclination may be any angle including horizontal.

The sensors 12 convert detected seismic energy into electrical or optical signals that are conducted to a recording unit 14. The recording unit 14 includes equipment (not shown separately) to make time indexed recordings of the signals from each sensor 12, or in the case of multi-component sensors, from each individual output of each sensor 12.

A microseismic event 13 occurs at a position in the subsurface volume and at a time to be determined using a method explained further below. The microseismic event may be naturally occurring or may be induced, for example by pumping fluid into or removing fluid from a rock formation in the subsurface volume.

Figure 2:
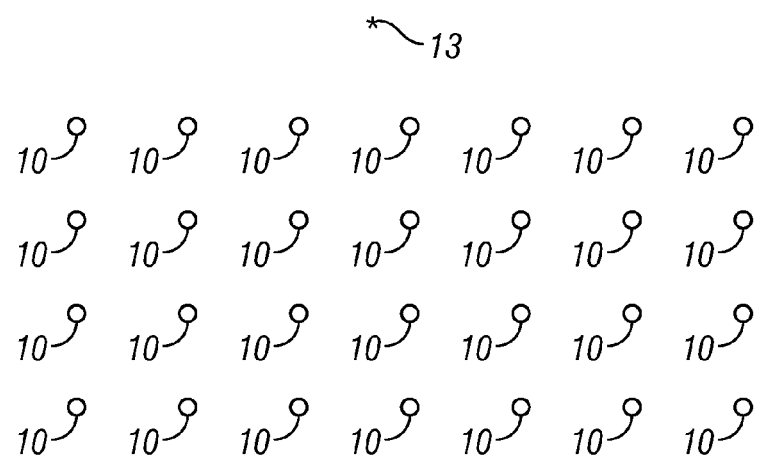
FIG. 2 is a plan view of a plurality of wellbores each having therein seismic sensors as shown in FIG. 1.

FIG. 2 shows an example of a two dimensional (2D) array of wellbores 10 each having sensors disposed therein as explained with reference to FIG. 1. The size of the array, and consequently the number of wellbores will depend on the depth at which microseismic events are expected to occur. Array size is determined by the target depth and the desired spatial resolution. To achieve resolutions necessary for commercial projects the radius of the array may be approximately equal to the depth of the target. Although a regularly spaced array is shown in FIG. 2, other arrangements of wellbores may be used in accordance with the invention.

Spacing between adjacent wellbores is a design choice to accommodate the necessary array size for the desired spatial resolution and the number of geophones required for noise suppression. A typical value for spacing between wellbores is 1 km.

During operation of a 2D array as shown in FIG. 2, signals detected by each sensor (12 in FIG. 1) are recorded (e.g., in the recording unit 14 in FIG. 1) for a selected period of time. The signal recordings may then be processed (e.g., in a processor in the recording unit 14 in FIG. 1) to beam steer the response of the sensors to enhance signal detection and to reduce noise. In one example, each array of sensors (i.e., those sensors in a single wellbore) may be beam steered along a predetermined direction. In the present example, the selected direction for each wellbore array may be to a common point or common volume in the subsurface. The beam steered signals from each vertical array may then be combined. In another example, all the sensor recordings along all levels and in each wellbore (10 in FIG. 1) can be beam steered to a common point or volume in the subsurface. Beam steering can be performed by adding a suitable time delay to the signal recording from each sensor such that an event occurring at a specific time would reach each receiver at the associated delay time if the event originated at the specific point or from the specific volume in the subsurface. The time delay applied to the signals from each sensor will therefore depend on the geodetic position and depth of each sensor, and the spatial distribution of seismic (acoustic) velocity of the formations in the subsurface. The velocity spatial distribution is typically determined beforehand by active source reflection seismic surveying or similar techniques, in some cases combined with acoustic measurements made from one or more wellbores penetrating the rock formations at least to the target depth.

The foregoing beam steering process is then repeated to focus the response of the array to each point or volume in the subsurface within a total selected volume that is to be evaluated for microseismic events in the signal recordings.

After a beam steered response for each subsurface point or subsurface volume within the total selected volume is generated as explained above, microseismic events may be identified as to their position and time of origin. One particular example of identification of microseismic events is described in U.S. Pat. No. 7,663,970 issued to Duncan et al. and commonly owned with the present invention.

In a particular example, surface originating noise may be further reduced in the seismic signals detected in each wellbore by using noise measured at one sensor, in particular, periodic and/or harmonic noise caused, for example, by electric power use, to predict the noise occurring at the next sensor, for example, starting at the shallowest sensor and continuing to subsequently deeper sensors in each wellbore. One way to predict the noise at successively deeper sensor is to use a Weiner filter. See, for example, J. Wang, F. Tilmann, R. S. White, and H. Soosalu, University of Cambridge, U. K., and P. Bordoni, Istituto Nazionale di Geofisica e Vulcanologia, Rome, Italy, *Application of multichannel Wiener filters to the suppression of ambient seismic noise in passive seismic arrays*, The Leading Edge, Society of Exploration Geophysicists, February 2008. The Weiner filter may be used to reduce the amplitude of such periodic noise in the successively deeper sensors by subtracting the predicted noise from the recorded signals at each deeper sensor.

Figure 3:
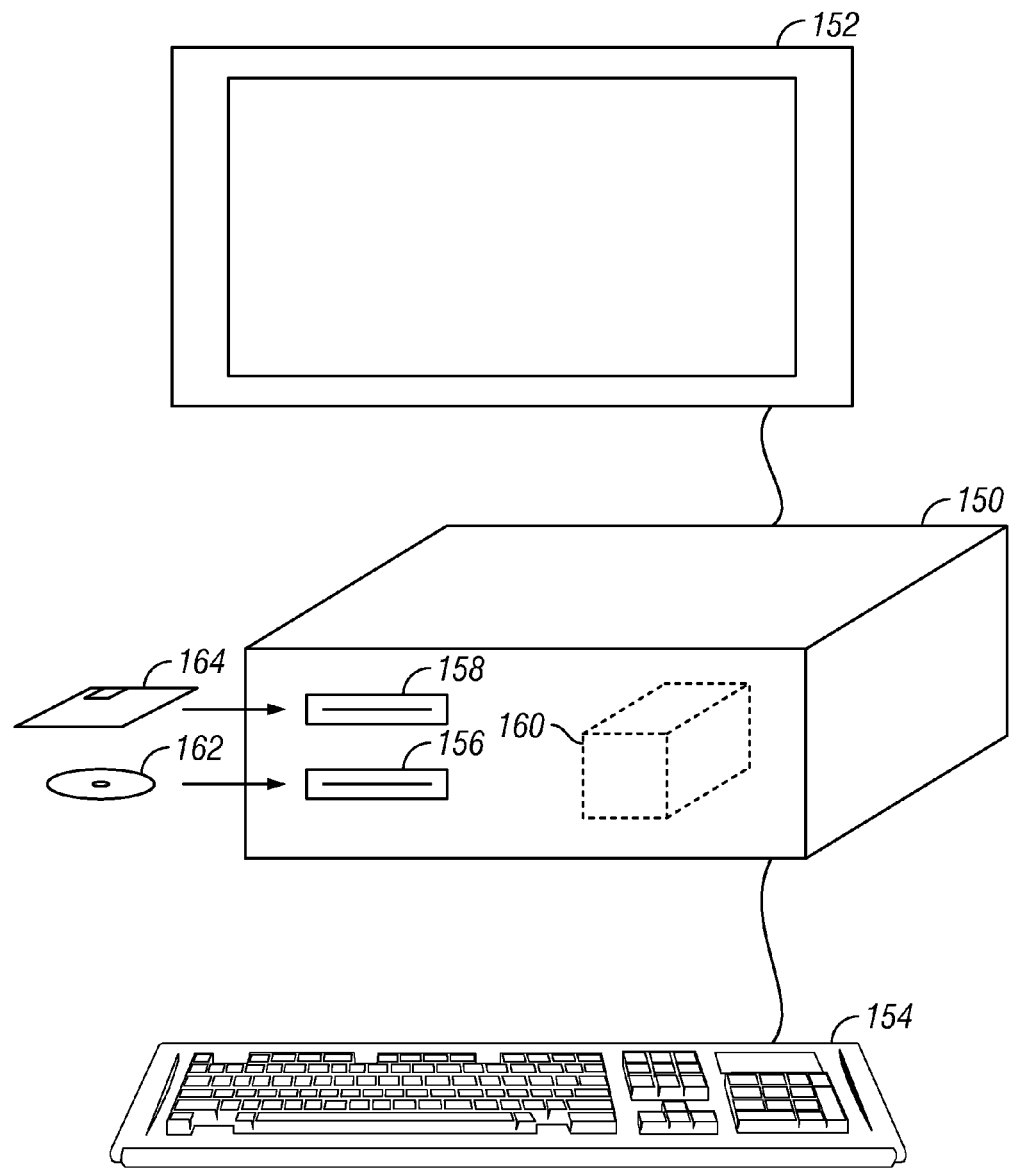
FIG. 3 shows a programmable computer and computer readable media including a computer program for carrying out a method according to the invention.

In another aspect, the invention relates to computer readable media storing thereon a computer program for carrying out the method described above with reference to FIGS. 1 and 2. Referring to FIG. 3, the foregoing process as explained with reference to FIGS. 1-5, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (14 in FIG. 1) or may be another computer. According to this aspect of the invention, the computer readable medium includes logic operable to cause the computer to execute acts as set forth above and explained with respect to the previous figures on the seismic signal recordings (e.g., beam steering response of the array or the sensors in each well to selected points or volumes in the subsurface and identifying time and position of origin of at least one microseismic event therefrom.

Methods for acquiring and processing passive seismic signals according to the invention may provide improved rejection of noise originating near the Earth's surface (or water bottom) than previous methods using only a single "layer" (single common plane deployment) of seismic sensors in wellbores.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for passive seismic surveying, comprising:
   deploying seismic sensors in a plurality of spatially distributed wellbores disposed above a volume of subsurface formations to be evaluated, the sensors in each wellbore forming a line of sensors, each sensor generating optical or electrical signals in response to seismic amplitude;
   recording the seismic signals from each sensor for a selected period of time;
   beam steering the response of the seismic sensor recordings to at least one of a selected point and a selected volume in the subsurface;

identifying at least one microseismic event in the beam steered response;

beam steering the response of the seismic sensor recording to each point or volume in a selected volume of the subsurface to be evaluated; and determining a time of origin and position of origin of microseismic events originating within the selected volume.

2. The method of claim 1 wherein the beam steering is performed for all sensors in each individual wellbore.

3. The method of claim 1 wherein the beam steering is performed for all sensors in all wellbores to a same selected point or volume in the subsurface formations.

4. The method of claim 1 wherein the sensors are single component geophones.

5. The method of claim 1 wherein the sensors are multiple component geophones.

6. The method of claim 1 wherein corresponding sensors in each wellbore are disposed at same depths from the surface.

7. The method of claim 1 further comprising, in each wellbore, determining noise in the recorded signals from a first sensor, and predicting noise at at least one adjacent sensor.

8. The method of claim 7 wherein the predicting noise is performed using a Weiner filter.

9. The method of claim 7 further comprising subtracting the predicted noise from the recorded signals at the adjacent sensor.

10. The method of claim 1 wherein the beam steering is performed for all sensors in each individual wellbore.

11. The method of claim 1 wherein the beam steering is performed for all sensors in all wellbores to a same selected point or volume in the subsurface formations.

12. A non-transitory computer readable medium having a computer program stored thereon, the program having logic operable to cause a programmable computer to execute steps comprising:

accepting as input recordings of electrical or optical signals detected by seismic sensors disposed in a plurality of spatially distributed wellbores disposed above a volume of subsurface formations to be evaluated, the sensors in each wellbore forming a line of sensors;

beam steering the response of the seismic sensor recordings to at least one of a selected point and a selected volume in the subsurface;

identifying at least one microseismic event in the beam steered responses;

beam steering the response of the seismic sensor recording to each point or volume in a selected volume of the subsurface to be evaluated; and determining a time of origin and position of origin of microseismic events originating within the selected volume.

13. The computer readable medium of claim 12 wherein the beam steering is performed for all sensors in each individual wellbore.

14. The computer readable medium of claim 12 wherein beam steering is performed for all sensors in all wellbores to a same selected point or volume in the subsurface formations.

15. The computer readable medium of claim 12 wherein the sensors are single component geophones.

16. The computer readable medium of claim 12 wherein the sensors are multiple component geophones.

17. The computer readable medium of claim 12 wherein corresponding sensors in each wellbore are disposed at same depths from the surface.

18. The computer readable medium of claim 12 wherein the logic causes the computer to further perform for the sensor recordings from each wellbore, determining noise in the recorded signals from a first sensor, and predicting noise at at least one an adjacent sensor.

19. The computer readable medium of claim 18 wherein the logic causes the computer to predict noise using a Weiner filter.

20. The computer readable medium of claim 18 wherein the logic causes the computer to perform subtracting the predicted noise from the recorded signals at the adjacent sensor.

21. The computer readable medium of claim 12 wherein the beam steering is performed for all sensors in each individual wellbore.

22. The computer readable medium of claim 12 wherein the beam steering is performed for all sensors in all wellbores to a same selected point or volume in the subsurface formations.

* * * * *